July 21, 1959 Y. EYRAUD 2,895,373
DEVICE FOR RECORDING VARIATIONS IN THE DIAMETER
OF SUBSTANTIALLY CYLINDRICAL OBJECTS
Filed April 20, 1956 4 Sheets-Sheet 1
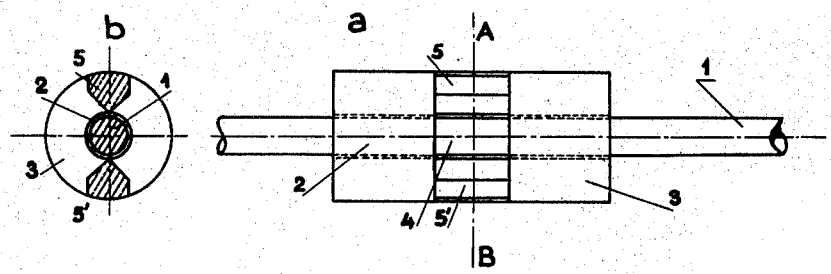
FIG_1
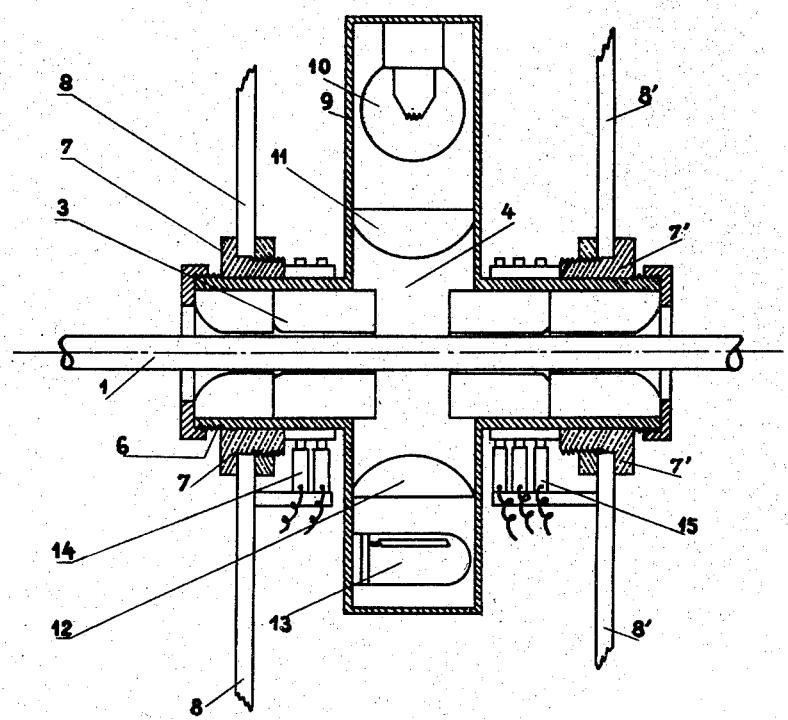
FIG_2
INVENTOR
YVAN EYRAUD
BY Paul M. Craig Jr.
ATTORNEY.

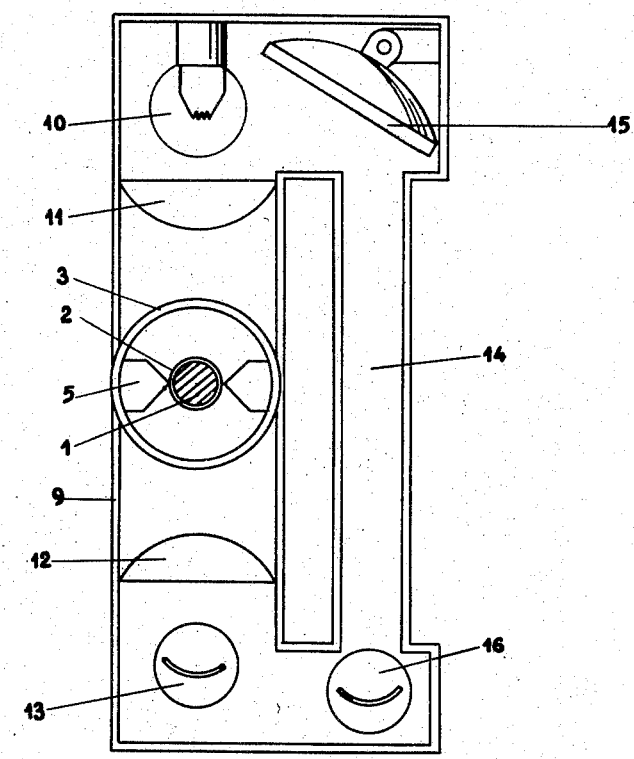
FIG_3

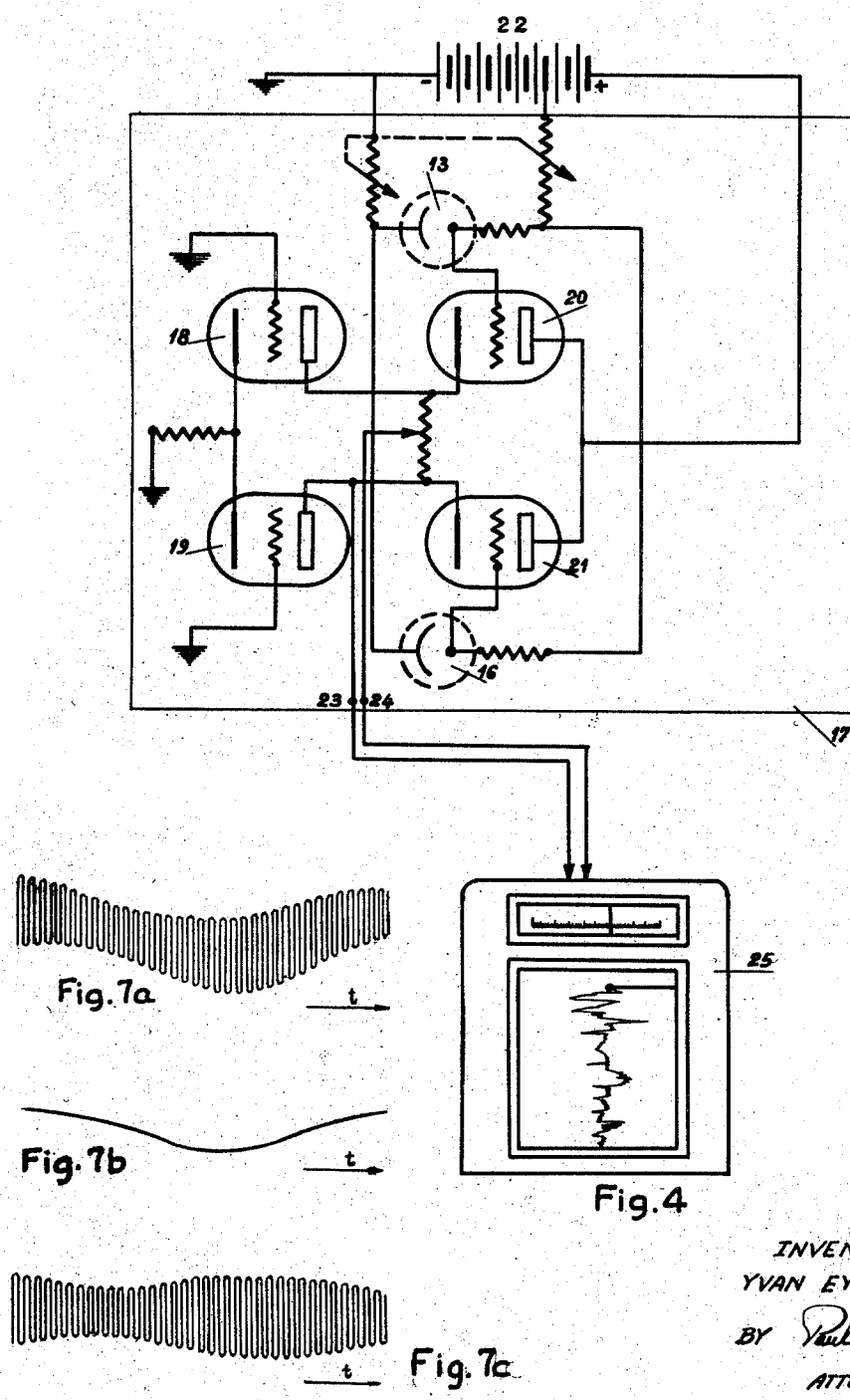

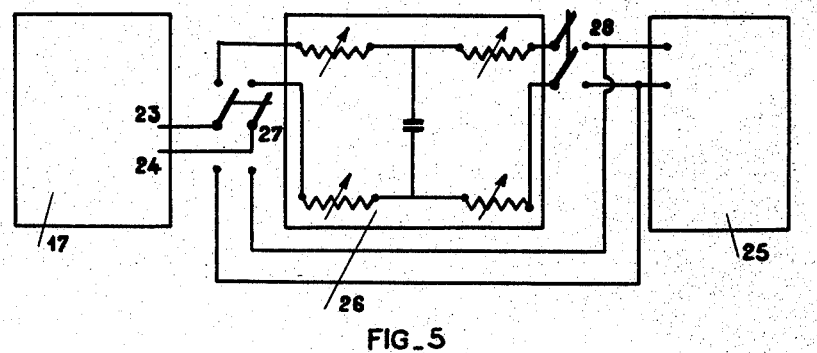
FIG_5
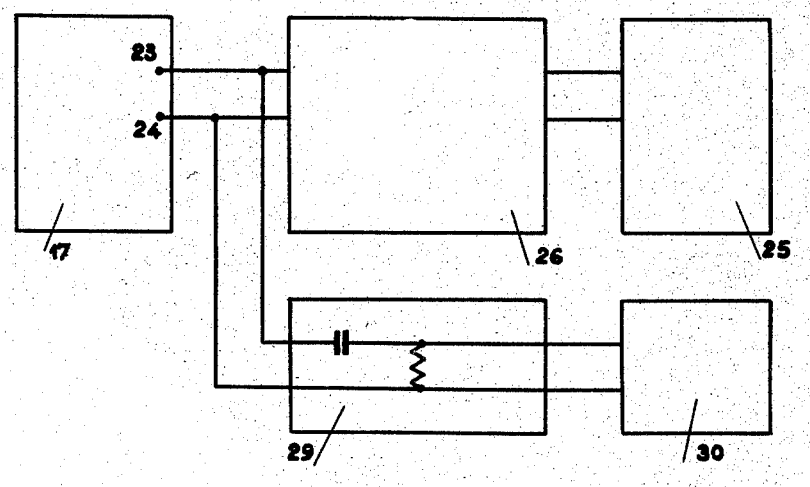
FIG_6

_2,895,373_

DEVICE FOR RECORDING VARIATIONS IN THE DIAMETER OF SUBSTANTIALLY CYLINDRICAL OBJECTS

Yvan Eyraud, Lyon, France, assignor to Compagnie Generale d'Electricite, Paris, France, a corporation of France Application April 20, 1956, Serial No. 579,511

Claims priority, application France April 28, 1955

2 Claims. (Cl. 88—14)

The present invention relates to a device for recording variations in the diameter of substantially cylindrical objects of considerable length, such as wires, bare or insulated electric conductors, insulating filaments or tubes, sheathings and like objects.

The device constructed according to the invention permits the recording not only of variations in the diameter of the said objects in any radial direction as the objects travel past the device, but also the variations in diameter in different radial directions in one cross-section of the object.

The known devices for recording variations in diameter are of two types, viz.:

Mechanical devices operating with a gauging means or with gas under pressure, and Photo-electric devices.

(1) In a device of the gauge type, the object to be measured travels between a friction member or a fixed roller on the one hand, and a movable member, such as a friction member or a roller, on the other hand. The motion of the movable member, which is amplified by a lever, is recorded by means of a stylus on a paper chart which is unwound at a constant speed or at a speed proportional to the speed of travel of the object to be measured.

With regard to the gas-pressure device, the principle thereof is based upon the retarding action on the gas in a tube through which the object to be measured travels.

(2) A photo-electric device has been described in applicant's French patent specification No. 992,844, applied for on September 13, 1944. The principle of such device is as follows:

The object travels past a window illuminated by a beam of parallel light rays, behind which a photo-electric cell is disposed. The quantity of light rays reaching the cell varies in accordance with the diameter of the object, which will intercept these rays to a greater or lesser extent. The electric current supplied by the cell varies thereby correspondingly and is amplified and recorded.

Both the gauge-type device and the cell-type device suffer from the disadvantage that they afford only an indication of the variation in diameter along the object in a predetermined radial direction, while the pressure-gas device only affords information regarding the mean diameter of a cross-section.

The device according to the invention, in which photo-electric cells are employed, has the advantage that it records, on the one hand, the variation of the diameter of an object as a function of the angle of the plane in which the measurement is made and of a fixed plane and, on the other hand, the variation of the mean diameter in each cross-section of the object. It is thus possible with this device to obtain both information regarding the ovalisation of the object and an indication of the variation of the mean diameter in one cross-section along the said object.

The device comprises in known manner an assembly of members, which will hereinafter be called the "measuring head" and which comprises an electric bulb having a point filament, a window illuminated by the said bulb and past which travels the object whose diameter is to be tested, and a photo-electric cell of the vacuum type, on the sensitive layer of which there converges the beam of light which has passed through the window and which has not been masked by the object. The measuring head comprises in addition, also in known manner, a second cell directly illuminated by the bulb and connected in bridge with the first, so that the total current of the two cells is zero for a predetermined dimension of the object to be measured. This current is applied, after amplification, to a recording device of any type.

According to the present invention there is provided a device for recording variations in the diameter of substantially cylindrical objects of considerable length, comprising a light source adapted to produce parallel light rays to illuminate a first photo-electric cell through a window, in front of which there is disposed the object undergoing test, and a second photo-electric cell illuminated directly by said light source, the resulting current supplied by the two cells being applied to a measuring and recording instrument, the assembly constituting a measuring head, wherein means is provided for turning the measuring head about the axis of the object in a plane perpendicular to the object whereby there can be recorded at will a curve representing the ovalisation of the object in a common cross-section, the object being maintained stationary and the measuring head being turned, or a curve representing the variation of the mean diameter of the object in a common diametral plane, the object being moved along the said window and the measuring head being maintained stationary, or a curve representing the ovalisation of the object superimposed on the curve representing the variation in the mean diameter along the object, the object and the measuring head being moved simultaneously.

For a better understanding of the invention and to show how the same may be carried into effect reference will now be made to the accompanying drawings in which:

Figures 1a and 1b show the calibrated window in elevation and in cross-section along the line A—B respectively.

Figure 2 is an axial sectional view of the measuring head.

Figure 3 is an end view of the same head.

Figure 4 illustrates the electric circuit arrangement of the device.

Figure 5 is a modified form of the circuit arrangement illustrated in Figure 4, comprising a network having a large time constant.

Figure 6 shows the circuit arrangement of a modified form, by means of which it is possible to observe simultaneously and separately the curve of the mean diameter and the ovalisation curve.

Figures 7a, 7b and 7c show the unmodified output curve, the curve of the mean diameter and the ovalisation curve, respectively, of the recording instruments described hereinafter.

The present invention is applicable in a general way to known types of arrangements which comprise an assembly of parts including a "measuring head" which itself includes an electric lamp with a point filament, located behind a window in front of which is disposed the object to be tested. The measuring head further includes a photo-electric cell which receives that portion of the light beam which traverses the window and is not intercepted or masked by the object to be tested, and a second photo-electric light cell which is directly luminated by the lamp. The connections between the two cells are such that the sum total of the current produced thereby which is applied after amplification thereof to a recording instrument of any suitable type becomes zero for a predetermined dimension of the object to be tested and measured.

If, in such an arrangement, the object to be tested is moved in the direction of the axis thereof, it is possible to record the variations of the diameter of the object along its length, measured in the same diametrical plane.

Arrangements of this type are also known which enable recording of the variations of the diameter of the object to be tested in different radial directions in the same perpendicular section.

These types of arrangements usually comprise a measuring head which turns about the object to be tested, or which includes means to turn the object on itself with respect to the measuring head, i.e., which includes some means to provide relative rotary movement between the object to be tested and the measuring head.

The arrangement according to the present invention combines the respective advantages of the two arrangements of the prior art mentioned hereinabove into a single apparatus and permits thereby to simultaneously record, on two distinct apparatuses, the variations of the mean diameter along the object, on the one hand, and the variations of the diameter along different directions of the same perpendicular section, on the other, so as to thereby make possible a complete examination of the object to be tested.

To that end, the arrangement according to the present invention is characterized by the fact that it includes, at the output of the measuring head, a network having a large time constant associated with a first recorder, on the one hand, and a high-pass filter associated with a second recorder, on the other. Under these conditions, if the object is simultaneously moved past the measuring head and if the measuring head itself is rotated, a curve indicative of the mean diameter along the object to be tested is obtained on the first recorder, whereas the second recorder provides a curve indicative of the ovalisation of the object.

In fact, if $d$ is used to designate the apparent diameter of the object, that is the distance between two tangent planes of the perpendicular cross section, then this apparent diameter varies on the one hand as a function of the angle $\theta$ which is formed by an axis, connected to the movable head of the apparatus and perpendicular to the axis of the object, with a fixed plane containing the axis of the object, and on the other, as a function of the abscissa $x$ of a perpendicular section of the object, one end of the object being taken as origin of the abscissa. The equation for the variations of $d$ may be written as follows:

$$d = f(x, \theta)$$

If, in the apparatus according to the present invention $\theta$ and $x$ are varied linearly with the time $t$, then $$x = k_1 t$$
$$\theta = k_2 t$$

If the function $f(x,\theta)$ is differentiated with respect to time, then $$\frac{\partial f}{\partial t} = \frac{\partial f}{\partial x} \cdot \frac{\partial x}{\partial t} + \frac{\partial f}{\partial \theta} \cdot \frac{\partial \theta}{\partial t}$$

This equation may be rewritten as follows:

$$\frac{\partial f}{\partial t} = k_1 \frac{\partial f}{\partial x} + k_2 \frac{\partial f}{\partial \theta}$$

In order to obtain the variation of the diameter along a perpendicular section so as to measure the ovalisation of this perpendicular section, it is necessary in theory that $k_1 = 0$.

In effect, however, the ovalisation changes only slowly along the cable; consequently, it is possible to give a finite value to $k_1$ as long as $$k_1 \frac{\partial f}{\partial x}$$

is relatively small compared to $$k_2 \frac{\partial f}{\partial \theta}$$

Thus, it is possible to consider the function $f(x,\theta)$ as the superposition of a function $f_1(x)$ having a slow variation and a function $f_2(\theta)$ having a rapid variation. By utilizing a low-pass filter or an integrator, $f_1(x)$ may be obtained, whereas by utilizing a high-pass filter or a differentiate network, $f_2(\theta)$ may be obtained.

A recorder disposed at the output of the measuring head will, therefore, register the output curves having the shape shown in Figure 7a, which shows the shape without filter.

Figure 7b shows the shape of the curve after passing through a low-pass filter, whereas Figure 7c shows the shape of the curve after passage through the high-pass filter.

The speed of passage of the cable as well as the rotary speed of the movable head obviously depend on the type of cable, and in a general manner on the shape of the object to be controlled. Nevertheless, as shown hereinabove, the two constants $k_1$ and $k_2$ must be such that $$k_1 \frac{\partial f}{\partial x}$$

be small compared to $$k_2 \frac{\partial f}{\partial \theta}$$

For a given type of object, one selects a predetermined corresponding ratio of $$\frac{k_2}{k_1}$$

that is, one selects the number of rotations which the movable head must carry out while the object moves over a length thereof equal to unity.

For example, the ratio of $$\frac{k_2}{k_1}$$

may be selected to be approximately $$\frac{k_2}{k_1} = 0.1$$

turns per centimeter by assigning to the object a speed of three meters per minute and to the measuring head a rotary speed of 40 r.p.m. The integrator of well-known construction then has a time constant of four seconds and will be constituted, for example, by a condenser of 40 microfarads and by resistances $R_1$ and $R_2$ of 50 kilohms.

In the drawings, 1 designates the object to be tested, which can be translationally moved in the direction of its axis by means not shown. The object 1 passes through a central passage 2 in a tube 3, which is formed with a window 4 bounded by two walls 5, 5', which are bevelled to prevent parasitic reflection.

Figure 2 is a view of the whole measuring head in section along a plane perpendicular to that of Figure 1. The tube 3 formed with the window 4 is mounted in a cylindrical frame 6 adapted to turn about bearings 7, 7', supported by fixed cheeks 8, 8', respectively. The frame 6 comprises a tubular casing 9 which extends perpendicularly to its axis opposite the window 4, the said tubular casing containing a point-filament lamp 10, a lens 11 and, on the other side of the window, a second lens 12 and a photo-electric cell 13. The electrical connections of the lamp and of the cell are accessible through contact brushes 14, 15.

Figure 3 shows the measuring head in a plane perpendicular to that of Figure 2. The casing 9 carries a tubular part 14, opposite the ends of which there are disposed a mirror 15 adapted to reflect the light from the lamp 10 and a second photo-electric cell 16 which receives directly the rays reflected by the mirror 15.

Figure 4 shows by way of example the electric circuit arrangement of the device. The arrangement, which is designated as a whole by the reference numeral 17, comprises a bridge formed of four electron tubes 18, 19, 20 and 21, in the opposite arms of which the cells 13 and 16 respectively are connected. One of the diagonals of the said bridge is fed by a direct-current source 22, while a measuring and recording instrument 25, which may comprise an amplifier, is connected to the terminals 23, 24, in the other diagonal.

The modified form illustrated in Figure 5 comprises a network having a large time constant, which may be connected across the terminals 23, 24, of the electric device 17 and the recording instrument 25 by means of coupled reversing switches 27 and 28. The said network is constituted in known manner by an assembly of resistances and condensers, which are preferably adjustable. When the said network is connected, the recording instrument 25 traces solely the curve of the mean diameter, while when it is placed out of circuit the recording instrument traces the curve of the mean diameter together with the ovalisation curve.

The modified form illustrated in Figure 6 comprises, in addition to that of Figure 5, a shunt network 29 of known type, the input of which is connected to the terminals 23, 24, of the device 17, and the output of which feeds a second recording member 30, for example, an oscilloscope. The time constant of the shunt network 29 must clearly be less than the period of rotation of the measuring head. The device shown in Figure 6 permits of simultaneously and separately recording the curve of the mean diameter on the recording instrument 25, and the ovalisation curve on the recording instrument 30.

I claim:

1. A device including a measuring head for recording, during passage through said measuring head, the variations in the tranverse dimensions of objects having relatively great length, such as electric conductors, comprising means providing relative rotary movement between said measuring head and the object to be tested, a light source, means including a bridge circuit with a first photo-electric cell and a second photo-electric cell in operative relationship to said source for simultaneously detecting variations, along said object, of the mean dimensions in different radial directions, on the one hand, and variations of the dimensions of said object in different radial directions in the same perpendicular plane, on the other, and recording means connected to the output of said bridge circuit for individually recording said two types of variations.

2. A device for recording variations according to claim 1, wherein said recording means includes a first recorder and a network having a long time constant connected between the output of said bridge circuit and said first recorder, and a second recorder and a high-pass filter connected between the output of said bridge circuit and said second recorder.

References Cited in the file of this patent

UNITED STATES PATENTS

| | | |
|---|---|---|
| 2,510,347 | Perkins | June 6, 1950 |
| 2,641,960 | Strother | June 16, 1953 |
| 2,682,191 | Anderson | June 29, 1954 |